Sept. 10, 1940.   P. C. MILLER   2,214,427
HAY BUCKER AND STACKER
Filed Oct. 3, 1939   3 Sheets-Sheet 2
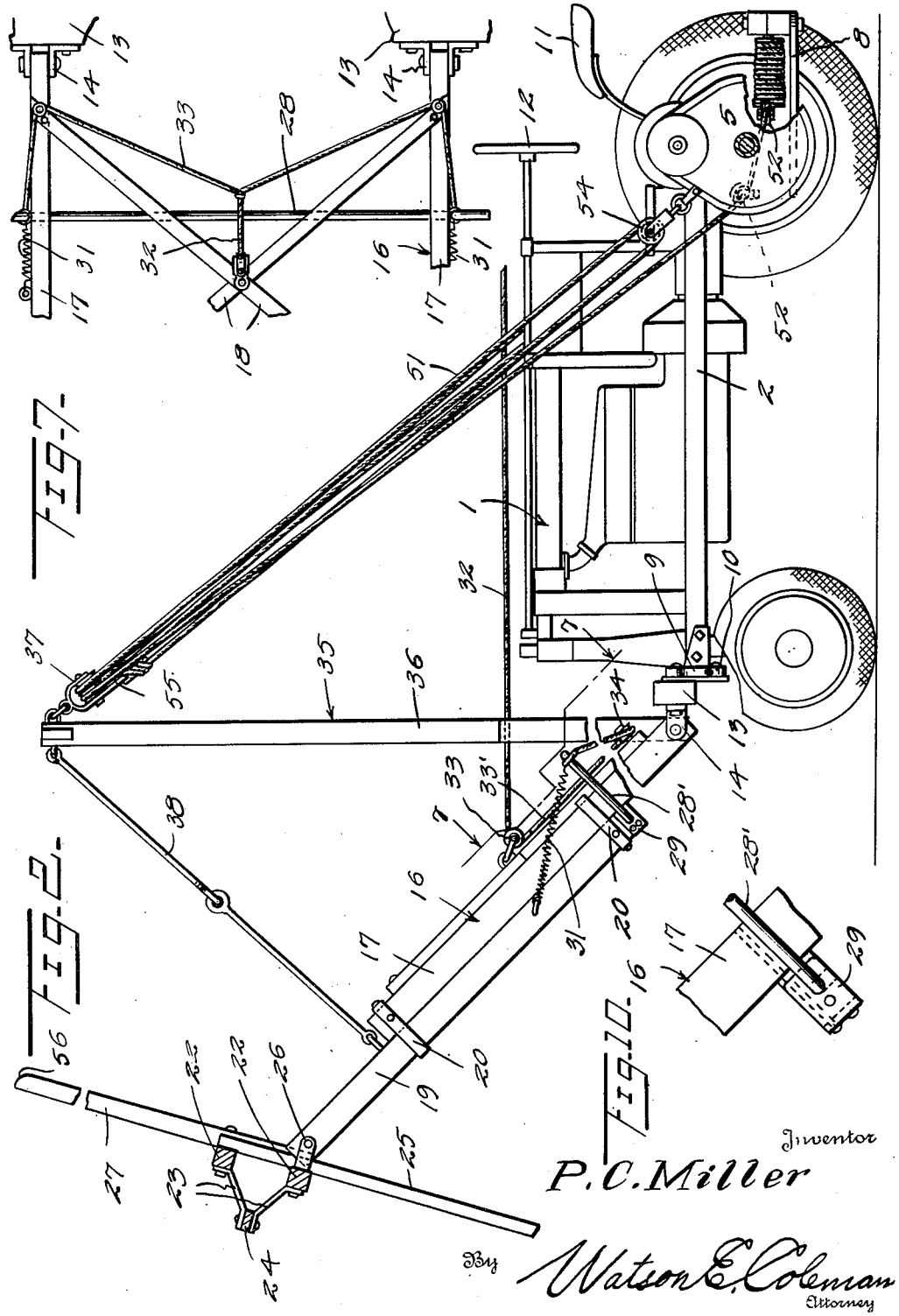
Inventor
P.C.Miller
By 
Attorney Sept. 10, 1940.　　　　P. C. MILLER　　　　2,214,427
HAY BUCKER AND STACKER
Filed Oct. 3, 1939　　　3 Sheets-Sheet 3
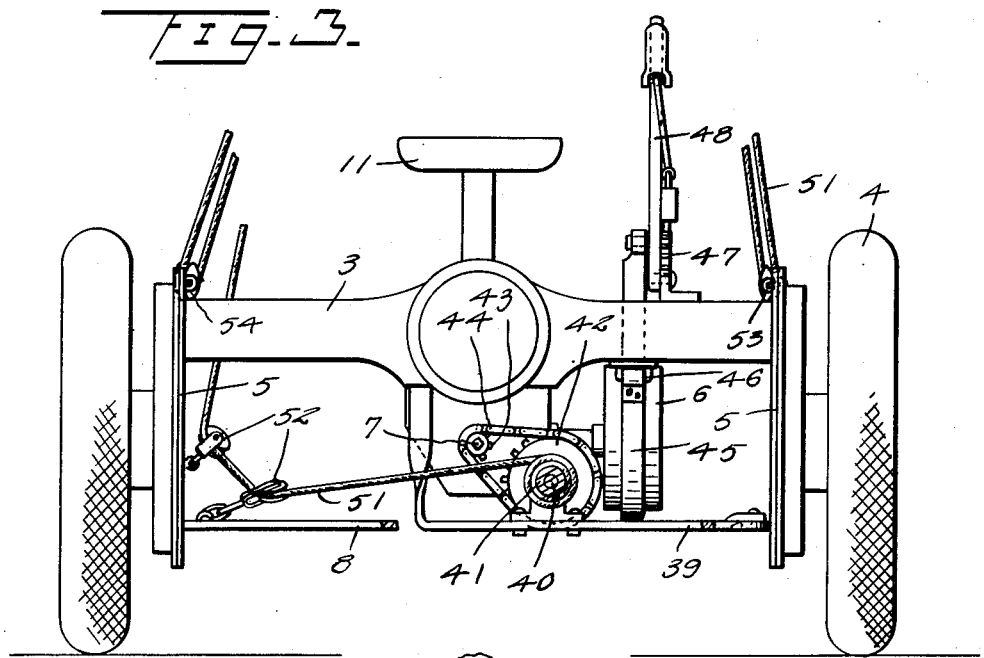
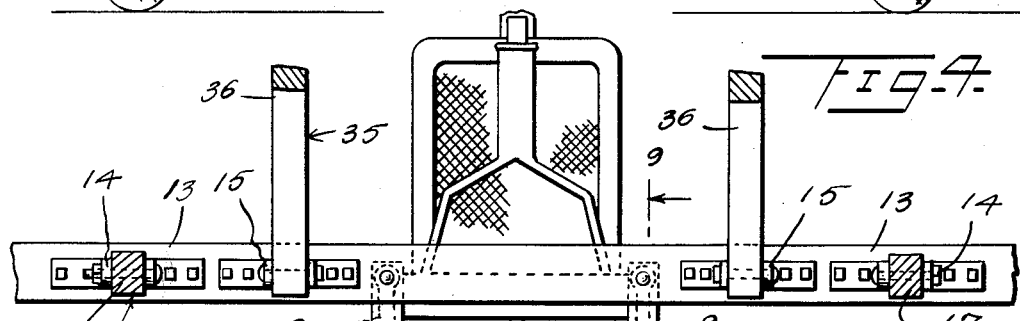
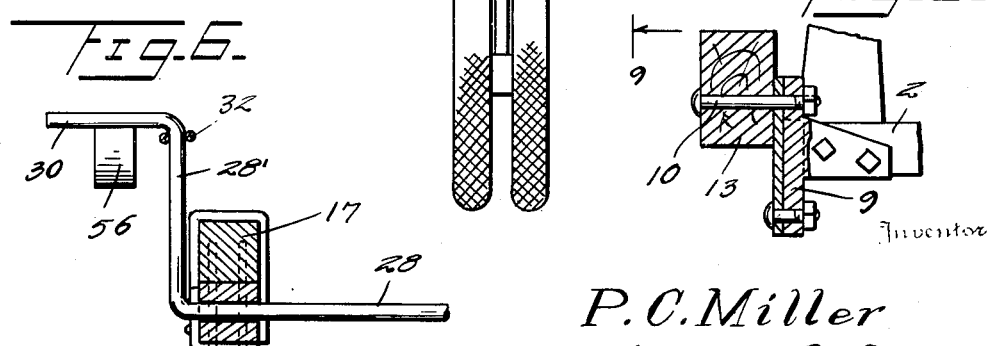
P. C. Miller
By Watson E. Coleman
Attorney Patented Sept. 10, 1940

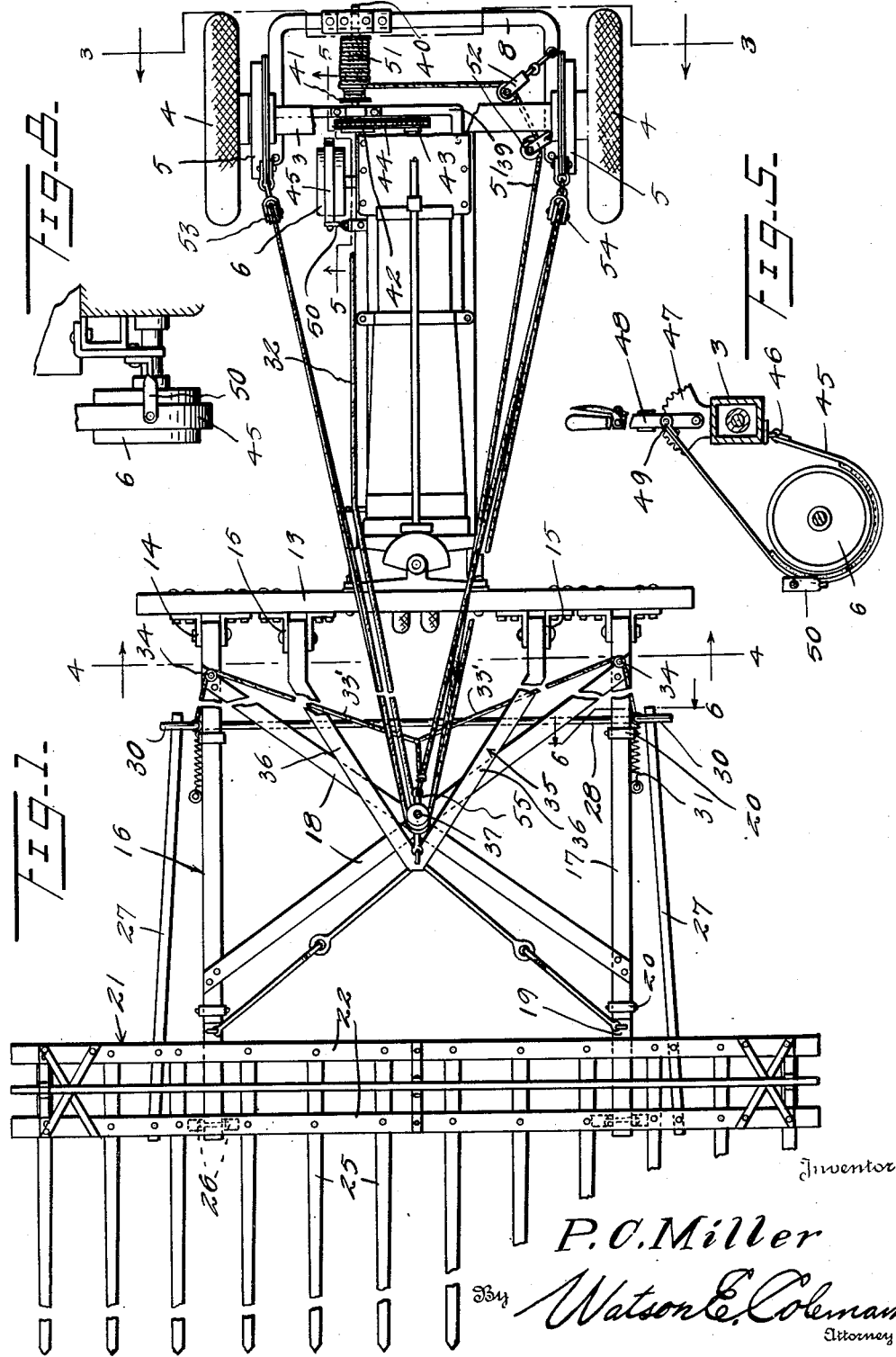

2,214,427

UNITED STATES PATENT OFFICE 2,214,427

HAY BUCKER AND STACKER

Percy C. Miller, Madison, S. Dak.

Application October 3, 1939, Serial No. 297,752

5 Claims. (Cl. 214—140)

This invention pertains generally to agricultural machines and more particularly to improvements in tractor operated hay buckers and stackers.

The present invention has for its primary object to provide a novel and improved hay bucker and stacker designed to be carried upon the front end of and operated by a tractor and constructed and arranged whereby a load of material may be picked up, raised into the air and dumped from a high point, thus facilitating the gathering and piling or stacking of hay, manure or other farm material of like character.

Another object of the invention is to provide a hay bucker and stacker including a pivoted or oscillatable rake, having a vertically swingable forwardly or longitudinally extensible frame structure adapted to be connected at one end to the front of a tractor and to have the rake unit pivotally attached to its other or forward end, means being provided in association with the frame for facilitating the raising and lowering of the front end thereof whereby the rake may be raised to a desired height for the discharge of material which it has picked up.

A further object is to provide in a structure of this character, a two-part extensible frame pivotally supported for vertical oscillation, having associated therewith a pivotally supported mast which is loosely coupled with the forward section of the frame and which has connected therewith a hoist mechanism operatively coupled with the power takeoff of the tractor whereby, by vertically oscillating the mast, the rake carrying frame may be vertically oscillated.

A still further object is to provide in a structure of the character stated, a two-part longitudinally extensible rake supporting frame which is pivotally attached to a tractor frame and in which a novel latching means is provided for maintaining the rake on the forward end of the frame in a predetermined position with respect to the frame from which position it may be released while carrying a load so as to facilitate the dropping or dumping of the load, the releasing means being operable from the driver's seat of the tractor.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 is a view in top plan of the structure embodying the present invention, parts of the same being broken away, together with a plan view of a conventionally illustrated tractor upon the front end of which the bucker and loader is mounted.

Fig. 2 is a view in side elevation of the structure shown in Fig. 1, but showing the rake supporting frame and mast raised and the rake released for dumping.

Fig. 3 is a sectional view on the line 3—3 of Fig. 1.

Fig. 4 is a sectional view on the line 4—4 of Fig. 1.

Fig. 5 is a sectional view on the line 5—5 of Fig. 1.

Fig. 6 is a sectional view on the line 6—6 of Fig. 1.

Fig. 7 is a plan view illustrating the details of the rake latching and releasing mechanism.

Fig. 8 is a detail view illustrating the friction band holding means.

Fig. 9 is a sectional view on the line 9—9 of Fig. 4.

Fig. 10 is a detail view in side elevation of one of the latching arms showing the supporting means therefor.

Referring now more particularly to the drawings, the numeral 1 generally designates the tractor structure upon which the present bucker and stacker is mounted for operation. This tractor is of a standard well known design or make, having the frame portion 2 supported at the rear by a rear axle housing 3 to which is connected at each of its ends a rear supporting and drive wheel 4 through the medium of gear mechanism (not shown) enclosed within the gear housing 5.

At the rear of this tractor structure there is arranged a laterally extending power takeoff pulley 6 which is operatively coupled with the tractor engine and extending rearwardly from the engine housing is a power takeoff shaft 7. Connecting the gear housings 5 is the usual draft bar 8 which extends parallel to and is disposed rearwardly of the housing 3 and in elevation below the same as shown in Fig. 3.

The forward end of the tractor frame carries a pair of transversely spaced plates 9 which are apertured to receive vertically spaced bolts 10.

At the rear of the tractor are the usual operator's seat 11 and steering wheel 12.

In carrying out the present invention there is provided a supporting beam 13 which is disposed transversely of the front of the tractor against the supporting plates 9 and is secured to these plates by the upper ones of the bolts 10, as shown in Fig. 9.

To the front of this supporting beam there are secured the outer pairs of hinge brackets or ears 14 and between these pairs of hinge brackets there are secured the inner pairs of hinge brackets 15.

The numeral 16 generally designates a two-part extensible rake supporting frame. This frame comprises an inner portion made up of the two spaced parallel side beams 17 which are coupled together and rigidly held in spaced parallel relation by the crossed brace bars 18, and an outer portion which is made up of the two spaced parallel beams 19, each of which is slidably disposed against the underside of a beam 17 and is coupled therewith by means of a pair of guide loops 20, as shown in Fig. 2. As is also clearly shown in this figure, one guide loop of each pair is attached to the outer or forward end of the inner frame unit while the other guide loop is attached to the inner end of the outer frame loop so that when the outer frame unit is shifted, a guide loop 20 which is attached to the inner end of each of its beams 19 will slide forwardly on a beam 17 and each of the beams 19 will slide through a guide loop 20 which is attached to the outer end of the adjacent beam 17.

Each of the beams 17 of the inner frame unit is pivotally secured to a hinge unit 14 so that the frame may swing vertically.

The numeral 21 generally designates a rake structure which may be of any suitable form but is here shown as having a pair of spaced parallel rear bars 22 which are joined together by the upwardly extending converging arms 23 which are attached to a back bar 24. This bar 24, as shown in Figs. 1 and 2, extends longitudinally of the bars 22 in a plane above the same and in a vertical plane passing between the bars 22. To the undersides of the bars 22 there are attached the rake tines 25.

The bars 22 are disposed across the frame 16 and rest upon the forward ends of the shiftable beams 19, the forward bar 22 being pivotally attached to each of the shiftable beams 19, as indicated at 26 in Figs. 1 and 2. Thus it will be seen that when the rake is in a position to pick up material from the ground, it will be in the same plane as the frame 16 and the rear one of the bars 22 will rest upon the top of the beam 19.

Secured to the rake bars 22 at each side of the frame 16 and extending rearwardly upon the outer side of the frame is a latching bar 27. Extending transversely of the underside of the frame 16 adjacent the rear of the latter is a rock shaft 28 which is supported in suitable bearing blocks 29 which are attached to the undersides of the beams 17. Each end of the shaft 28 terminates in the upwardly extending arm 28' having the outwardly extending latching finger 30 and beneath this latching finger 30 the end of the adjacent latch bar 27 engages. By this means the rake is maintained in working position, by which is meant that it is maintained in the same plane as the frame 16, so that it may be shoved forwardly over the surface of the ground for the purpose of picking up hay or other material. The latching fingers 30 are normally held in engagement with the latching bars 27 by springs 31 which are attached to the upturned ends 28' of the rock shaft 28 and to the adjacent sliding beam 19. These springs are of suitable form or construction so that they may stretch without damage when the shiftable portion of the extensible frame is moved forwardly.

The latch fingers are controlled from the driver's seat by a pull cord 32 which extends forwardly to a pulley or other suitable guide means 33 carried upon the braces 18 and joins the two laterally extending cords 33' which pass around pulleys or other suitable guides 34 disposed over or adjacent to the beams 17 and then pass forwardly to the adjacent latch fingers 30 to which these cords are attached. Thus it will be seen that by pulling the cord 32, the diverging cords 33' will be pulled so as to retract the upturned ends 29 of the rock shaft and thus disengage the latch fingers 30 from over the ends of the adjacent latch bars 27. This permits the rake to rock on the hinges 26 so that the points of the tines will drop or swing downwardly.

The inner pair of hinge units 15 supports a mast structure which is generally designated by the numeral 35 and consists, as shown, of a pair of beams 36, each of which is pivotally coupled at one end of a unit 15. These beams are formed so that their other ends come into converging relation and are joined together, as is clearly shown in Fig. 1, and at the point of connection of the beams and consequently at the top of the mast, there is mounted a double sheave pulley 37. The top end of the mast also has attached thereto the link bars 38 which extend forwardly and downwardly and are attached to the sliding beams 19, as shown in Fig. 2.

At the rear of the tractor there is secured a horizontal support bracket 39, as shown in Fig. 3. One end of this bracket is attached to a gear housing 5 while the other end is joined to an adjacent part of the machine structure upon the side of the power takeoff shaft 7 from the housing 5 to which the bracket is attached. Supported between this bracket and the draft bar 8 is a cable drum shaft 40 upon which is mounted the cable drum 41 and at the end of the shaft 40 nearest the power takeoff 7, there is mounted on the shaft the sprocket gear 42. The power takeoff shaft 7 is supplied with a small sprocket gear 43 and these gears are operatively coupled together by a sprocket chain 44.

Control of the rotation of the shaft 40 is effected by means of the mechanism shown in Figs. 1, 5 and 8. This mechanism comprises a friction band 45 which has one end attached, as at 46, to the adjacent axle housing 3. Upon the axle housing is mounted a toothed segment 47 upon which is rockably supported the lever 48 and to this lever is attached the other end of the friction band 45, as indicated at 49. The band 45 passes around the power takeoff drum 6 and, as shown in Fig. 8, the band is held centered around the drum by the guiding or holding bracket 50 which is attached at one end to the band and at the other end to an adjacent part of the machine structure. By the provision of this friction or brake band 45, the operation of the cable drum 41 is controlled so that the drum may be held in any desired position and consequently hold the stacker in a raised or lowered position through the medium of the tackle mechanism about to be described.

The numeral 51 generally designates the control cable or rope by means of which the raising and lowering of the rake through the medium of the mast 35 is effected and this rope or cable is wound around the control drum 41 and passes from this drum through suitable guide pulleys 52 which are supported upon or adjacent to one of the gear housings 5, to a sheave of the pulley 37, passing around this sheave and back toward the rear of the tractor and toward the side of the tractor opposite from the pulleys 52, where it passes around a pulley 53 which is attached, as shown in Fig. 1, to the adjacent gear housing 5. The cable then runs forwardly again to the pulley 37 and passes around the other sheave of this pulley and rearwardly again upon the side of the tractor adjacent the pulleys 52 and opposite from the pulley 53, to pass around a pulley 54 which is supported upon the other gear housing 5, that is, the gear housing nearest the pulleys 52. The cable then passes from the pulley 54 forwardly again and is secured to and terminates at the pulley 37, being attached to the pulley, as indicated at 55, Figs. 1 and 2.

With this tackle arrangement it will be readily seen that when the drum 41 is rotated in the proper direction by the power takeoff shaft 7, a pull will be exerted upon the upper end of the mast 35 so as to vertically oscillate the mast to a vertical or upright position and thereby lift the outer end of the frame 16.

While the structure 16 has been described as a "frame," it might also be described as being made up of two forwardly extending extensible or telescopic arms, the inner end of each arm being pivotally coupled to the beam 13 by a hinge unit 14 while the outer end of the arm is pivotally coupled by the hinge connection 26 with the underside of the rake. Such construction might be employed without having the intermediate bracing bars 18 which makes an integral frame unit out of the structure, but it is preferred that the bracing bars be employed as this gives additional rigidity and strength to the structure.

As previously stated, by the provision of the friction band 45 or brake associated with the pulley 6 which is operatively coupled with the machine mechanism by which power is transmitted either to the pulley or to the power takeoff shaft 7, the drum 41 may be held from turning by the operation of the brake and thus the mast, frame and rake may be held in any position on its way up or down. It will also be understood that by the provision of the novel tackle arrangement, a straight or direct pull is applied to the frame so that heavy loads may be lifted by the rake without subjecting the rake and frame to twisting strain.

In the operation of the bucker and stacker, the arms or the extensible portions of the frame structure may be retracted, but as the height of the pile of material which is being stacked, increases, the extensible beams 19 may be shifted forwardly, thus enabling the operator of the rake to raise the loads higher and higher as the height of the stack increases, until the maximum height for which the structure is designed, is reached.

The method of holding and releasing the rake structure for oscillation on the hinges 26 has been described. It will be noted, however, that the latch bars 27 are rounded at their rear ends, as designated at 56, Fig. 2, so that when the rake is swung back into operating position or is swung down to a plane parallel with the frame 16, the ends of the arms will ride against the latch fingers 30 and force them to swing back against the tension of the springs 31 so that the ends of the bars may snap under the fingers.

While there has been shown and described a rake structure which is designed for the handling of hay and similar materials, such structures commonly being made of wood, it is to be understood that the invention is not to be limited to the use of a rake of this specific character as it is contemplated as being within the scope of the present invention, to substitute a steel rake structure for the one here shown and described, so that such rake might be used for the handling of manure.

What is claimed is:

1. A bucker and stacker of the character stated, comprising a frame structure having two relatively movable unitary portions, means for pivotally coupling one of said portions to the front end of a tractor having a power takeoff whereby the frame structure may swing in a vertical path, the other of said portions being shiftable forwardly with respect to the tractor, a rake pivotally attached to the said other one of the portions for oscillation on a horizontal axis extending transversely of the frame structure, latching means for securing the rake on and substantially in the same horizontal plane as the frame structure, means for releasing the said latching means from a point remote from the rake to permit oscillation of the rake on the frame, a mast pivotally supported for oscillation on the same axis as the said one of the frame portions, coupling means between the upper end of said mast and the rake supporting portion of the frame, and a control cable coupling the upper end of the mast with said power takeoff whereby said mast, frame and rake may be oscillated vertically by the power takeoff mechanism.

2. A hay bucker and stacker for connection with a tractor having a power takeoff, comprising a beam transversely of the front end of the tractor, means securing the beam to the front of the tractor, a pair of extensible arms each comprising a rearward and a forward portion, means pivotally coupling the rearward portion of each arm to said beam whereby the arms may oscillate vertically upon a common axis, a rake unit disposed transversely of the forward portions of the arms and pivotally coupled thereto for oscillation on an axis extending transversely of the arms, a vertically disposed mast pivotally attached at one end to said beam and extending above said arms, coupling means between the upper end of the mast and the forward portions of the arms, a pulley attached to the upper end of said mast, a cable drum carried by the tractor and operatively coupled with the power takeoff, a cable wound on the drum and passing around and coupling said pulley with a fixed point on the tractor structure whereby said mast may be vertically oscillated to raise and lower said arms and rake, and releasable latching means maintaining said rake normally in a plane paralleling the arms.

3. A hay bucker and stacker for connection in association with a tractor having a power takeoff, comprising a beam transversely of the front end of the tractor, means securing the beam to the front of the tractor, a pair of extensible arms each comprising a rearward and a forward portion, means pivotally coupling the rearward portion of each arm to said beam whereby the arms may oscillate vertically upon a common axis, a rake unit disposed transversely of the forward portions of the arms and pivotally coupled thereto for oscillation on an axis extending transversely of the arms, a vertically disposed mast pivotally attached at one end to said beam and extending above said arms, coupling means between the upper end of the mast and the forward portions of the arms, a pulley attached to the upper end of said mast, a cable drum carried by the tractor and operatively coupled with the power takeoff, a cable wound on the drum and passing around and coupling said pulley with a fixed point on the tractor structure whereby said mast may be vertically oscillated to raise and lower said arms and rake, a latch bar carried by the rake and extending rearwardly adjacent an arm, a latch finger pivotally attached to said last arm and engaging said latching bar, and means for oscillating the latching finger from a point remote from the rake for the release of the rake for oscillation on its pivot.

4. A hay bucker and stacker for attachment to a tractor having a power takeoff, a cable drum supported on the tractor and operatively coupled with the power takeoff and means controlling the turning of the cable drum, comprising a beam secured transversely of the front of the tractor, a vertically oscillatable frame comprising a rearward portion made up of two spaced parallel beams each pivotally attached at one end to said first beam and a forward portion made up of two spaced parallel beams, each slidably attached to a beam of the rearward portion, a rake unit disposed across and pivotally attached to the beams of said forward portion for oscillation on an axis extending transversely of the frame, a mast comprising a pair of upwardly converging beams each pivotally attached to said first beam for oscillation in a vertical path, a two sheave pulley supported at the upper end of said mast, a coupling between the upper end of the mast and the beams of the forward portion of the frame, a pulley supported at each side of the tractor, a cable having an end wound about said drum and passing therefrom over one sheave of the first pulley and around one of said second-mentioned pulleys and back and over the second sheave of the first pulley to and around the other one of the second-mentioned pulleys and terminating at its other end at the first-mentioned pulley, and releasable means maintaining said rake against oscillation on the frame.

5. A hay bucker and stacker for attachment to a tractor having a power takeoff, a cable drum supported on the tractor and operatively coupled with the power takeoff and means controlling the turning of the cable drum, comprising a beam secured transversely of the front of the tractor, a vertically oscillatable frame comprising a rearward portion made up of two spaced parallel beams each pivotally attached at one end to said first beam and a forward portion made up of two spaced parallel beams, each slidably attached to a beam of the rearward portion, a rake unit disposed across and pivotally attached to the beams of said forward portion for oscillation on an axis extending transversely of the frame, a mast comprising a pair of upwardly converging beams each pivotally attached to said first beam for oscillation in a vertical path, a two sheave pulley supported at the upper end of said mast, a coupling between the upper end of the mast and the beams of the forward portion of the frame, a pulley supported at each side of the tractor, a cable having an end wound about said drum and passing therefrom over one sheave of the first pulley and around one of said second-mentioned pulleys and back and over the second sheave of the first pulley to and around the other one of the second-mentioned pulleys and terminating at its other end at the first-mentioned pulley, releasable means maintaining said rake against oscillation on the frame, said releasable means comprising a pair of latch bars carried by and extending rearwardly from the rake each adjacent a side of the frame, a pair of latch fingers pivotally supported for unitary oscillation on the frame and each engaging over an end of a latch bar, and means for shifting said latch fingers in a direction to disengage the same from the adjacent latch bars.

PERCY C. MILLER.